United States Patent
Lampsa et al.

(10) Patent No.: US 10,752,102 B2
(45) Date of Patent: Aug. 25, 2020

(54) TRAILER MOUNTED BATTERY RANGE EXTENDER FOR ELECTRIC TRUCK TRACTOR

(71) Applicants: John B. Lampsa, Wales, WI (US); Evan J. Lampsa, Wales, WI (US)

(72) Inventors: John B. Lampsa, Wales, WI (US); Evan J. Lampsa, Wales, WI (US)

( * ) Notice: Subject to any disclaimer, the term of this patent is extended or adjusted under 35 U.S.C. 154(b) by 0 days.

(21) Appl. No.: 16/362,343

(22) Filed: Mar. 22, 2019

(65) Prior Publication Data

US 2019/0291560 A1 Sep. 26, 2019

Related U.S. Application Data

(60) Provisional application No. 62/646,647, filed on Mar. 22, 2018.

(51) Int. Cl.
| | | |
|---|---|---|
| *B60K 1/04* | (2019.01) | |
| *B62D 53/06* | (2006.01) | |
| *B60S 5/06* | (2019.01) | |

(52) U.S. Cl.
CPC ........ *B60K 1/04* (2013.01); *B60K 2001/0438* (2013.01); *B60K 2001/0444* (2013.01); *B60K 2001/0472* (2013.01); *B60S 5/06* (2013.01); *B62D 53/06* (2013.01)

(58) Field of Classification Search
CPC .............. B60K 1/04; B60K 2001/0444; B60K 2001/0472; B60K 2001/0438; B60S 5/06; B62D 53/06; B60Y 2200/147
See application file for complete search history.

(56) References Cited

U.S. PATENT DOCUMENTS

| | | | | |
|---|---|---|---|---|
| 1,138,122 A | * | 5/1915 | Lambert | .............. B60K 1/04 180/68.5 |
| 3,821,997 A | * | 7/1974 | Sieren | ................ B60R 16/04 180/68.5 |
| 4,013,300 A | * | 3/1977 | Berger | ................ B60K 15/00 280/834 |

(Continued)

FOREIGN PATENT DOCUMENTS

| | | |
|---|---|---|
| WO | WO2008/086087 A3 | 7/2008 |
| WO | WO2012/120525 A1 | 9/2012 |

(Continued)

OTHER PUBLICATIONS https://www.trucker.com/equipment/air-disc-brakes-now-standard-It-tractor Jun. 15, 2017.

(Continued)

*Primary Examiner* — Erez Gurari
(74) *Attorney, Agent, or Firm* — Ryan Kromholz & Manion, S.C.

(57) ABSTRACT

A tractor trailer battery system having a battery compartment containing one or more battery units which house one or more battery cells, electrical leads from the battery units to a trailer mounted controller in electrical communication with a cab mounted controller which is in electrical communication an electric motor or hybrid engine system. The battery system allows for either the trailer mounted controller or the cab mounted controller to provide principal communication to the electric motor or hybrid engine system.

16 Claims, 6 Drawing Sheets

(56) References Cited

U.S. PATENT DOCUMENTS

| | | | |
|---|---|---|---|
| 4,216,839 A * | 8/1980 | Gould | B60K 1/04 180/65.1 |
| 5,585,205 A * | 12/1996 | Kohchi | B60K 1/04 429/99 |
| 6,732,825 B2 | 5/2004 | Takeda | |
| 7,147,070 B2 | 12/2006 | Leclerc | |
| 7,398,849 B2 * | 7/2008 | Yoshida | B60K 1/04 180/68.5 |
| 8,164,300 B2 | 4/2012 | Agassi et al. | |
| 8,215,436 B2 | 7/2012 | DeGrave et al. | |
| 8,789,472 B2 | 7/2014 | Mai | |
| 9,108,691 B2 | 8/2015 | Fanourakis et al. | |
| 9,586,458 B2 * | 3/2017 | Larson | B60H 1/00014 |
| 10,421,345 B2 * | 9/2019 | Kerspe | B60H 1/00364 |
| 2002/0017407 A1 | 2/2002 | Takeda | |
| 2008/0169144 A1 | 7/2008 | DeGrave et al. | |
| 2011/0114398 A1 * | 5/2011 | Bianco | B60L 50/66 180/65.1 |
| 2014/0025245 A1 * | 1/2014 | Fanourakis | B60W 20/15 701/22 |
| 2014/0116077 A1 | 5/2014 | Pierce et al. | |
| 2017/0267121 A1 * | 9/2017 | Kotik | B60L 50/66 |
| 2018/0056769 A1 * | 3/2018 | Kerspe | B60K 1/04 |
| 2018/0319263 A1 * | 11/2018 | Hegewald | B60K 1/04 |
| 2019/0291560 A1 * | 9/2019 | Lampsa | B60K 1/04 |

FOREIGN PATENT DOCUMENTS

| | | |
|---|---|---|
| WO | WO2014/044613 A1 | 3/2014 |
| WO | WO2014/044618 A1 | 3/2014 |
| WO | WO2016/116655 A1 | 7/2016 |

OTHER PUBLICATIONS https://www.trucker.com/equipment/cummins-aims-offer-electrified-powertrain-two-years Jun. 15, 2017.
https://www.trucker.com/must-reads/spot-rates-jump-all-truckload-types, Jun. 15, 2017.
https://electrek.co/2017/01/04/automotive-execs-battery-powered-cars-vs-fuel-cells, Jan. 4, 2017.
https://www.truckinginfo.com/159948/electric-semi-more-sizzle-than-steak, May 2, 2017.
https://www.ccjdigital.com/cummins-to-introduce-fully-electrified-powertrain-for-urban-transportation-in-2019 Jun. 15, 2017.
http://enewspro.penton.com/preview/americantrucker/AT-01/20170615_AT-01_407/display?elqTrack=true, Jun. 15, 2017.

* cited by examiner

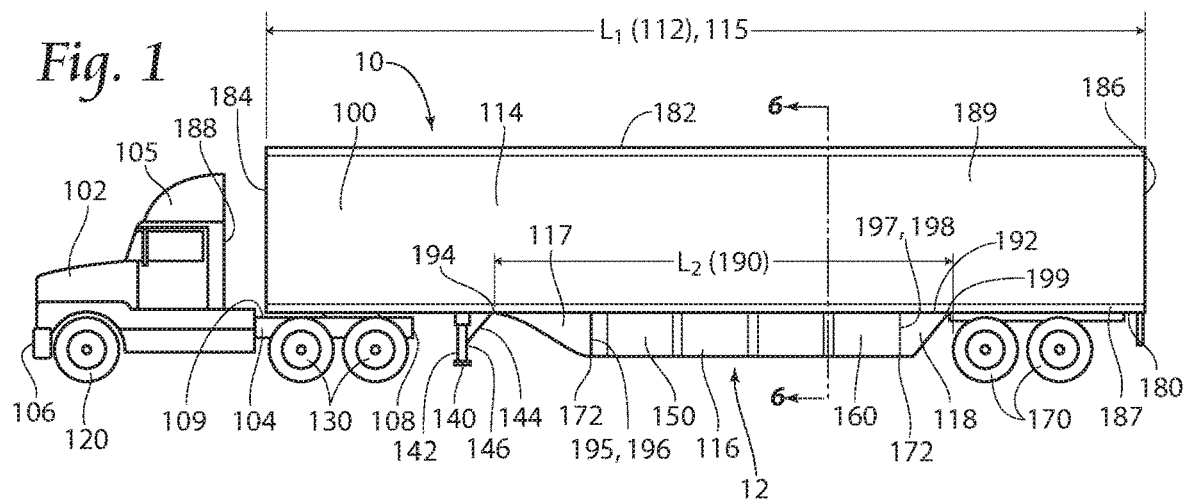
Fig. 1
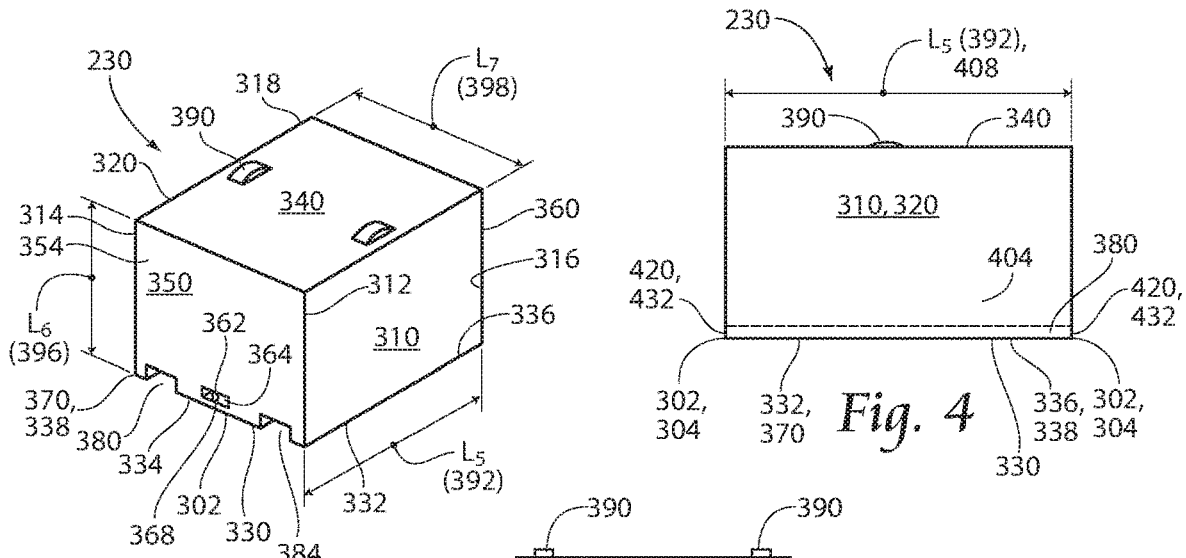
Fig. 2
Fig. 3
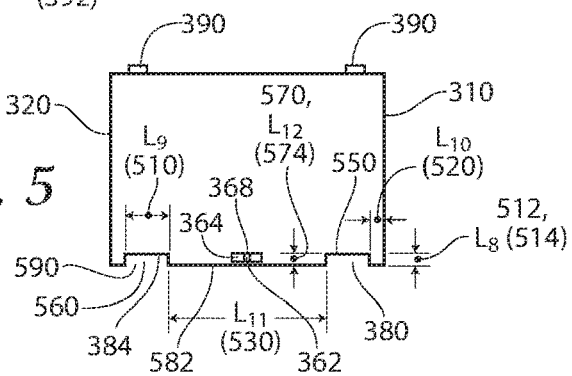
Fig. 4
Fig. 5

TRAILER MOUNTED BATTERY RANGE EXTENDER FOR ELECTRIC TRUCK TRACTOR

RELATED APPLICATIONS

This application claims the benefit of U.S. Patent Application Ser. No. 62/646,647, filed 22 Mar. 2018.

BACKGROUND OF THE INVENTION

The present invention pertains to a tractor trailer battery system. Tractor trailers are typically used to haul cargo from one location to another. The tractor trailer comprises a tractor or truck mechanically in communication with a trailer, where the cargo is stored in the trailer during transportation.

Tractor trailers employ diesel engines. Diesel engines have been used in large trucks such as tractor trailers due to the better fuel efficiency in long hauls, where idling is not common practice. In addition, diesel engines have been preferred over gasoline engines in trucks because of the increased torque provided by diesel engines at lower revolutions per minute, and the longer life cycles of diesel engines. However, as with gasoline, the cost of diesel fuel has risen.

Alternative power sources for vehicles have existed since the mid-$19^{th}$ century, when electricity was a preferred method for vehicle propulsion. Development in the area was surpassed by the internal combustion engine and remained so for almost 100 years. In recent years, increases in fuel prices and recognition of the harms the burning of fossil fuels have had on the environment have reinvigorated the push towards an electric transportation infrastructure. The reinvigoration has led to an opening of electric cars into the market from both established car makers and specialized manufacturers.

Developments have been made in the realm of trucks and tractor trailers. However, there remains a key variable that has to date been difficult to overcome, range. Current tractor trucks have a distance of less than 200 miles per battery charge. Long haul tractor trailers running on diesel fuel may run up to 1,400 miles before refueling. This number is dependent on the amount of fuel the tractor trailer is able to carry for use in transporting cargo and the efficiency of the engine powering the tractor trailer. The use of an electric tractor trailer having a 100-200 mile range is minimized to intra-population center cargo transportation. In addition, the amount of time required to recharge the batteries would reduce the hauling efficiency of the truck. Thus, the current electric powered tractor trailers are unable to efficiently transport products between population centers.

There is a need for a tractor trailer containing an electric motor or hybrid engine for the purpose of reducing fuel costs.

There is a need for a tractor trailer containing an electric motor or hybrid engine, with a range greater than 200 miles, for the purpose of transporting cargo between population centers. Thus, a need exists for extended range of travel, especially to match a typical driver "tour of duty", which is 10-11 hours per day, and 500-600 miles per day.

There is a need for a tractor trailer containing an electric motor or hybrid engine in which all battery cells in a trailer battery compartment can be exchanged in 15 minutes or less, the typical time it takes to fuel an existing diesel truck.

Finally, it is observed that developing battery cell and hydrogen technologies require large infrastructure investments. There is a need for a tractor trailer containing an electric motor or hybrid engine in which the required infrastructure is limited to existing technology at tractor trailer maintenance facilities, truck terminals, warehouses, cross docks, truck stops, or any facility designed for truck/tractor-trailer traffic.

SUMMARY OF THE INVENTION

The present invention comprises a tractor trailer battery system capable of powering or providing supplemental power (extending the range) for the movement of the tractor trailer.

A battery range extender system for a tractor-trailer, the tractor-trailer such as tractor-trailer, a semi-trailer, a tractor and trailer, a semi, a truck, a moving truck and other forms of moving vehicles. The tractor-trailer having a trailer; said trailer having an exterior; the battery range extender system comprising: a battery compartment, at least one battery cell, a first controller, and a first charging port, wherein the battery compartment is in fixed communication with the exterior; the battery compartment comprising at least one battery unit; the at least one battery unit having a battery unit cavity defined by a first side and an oppositely opposed second side; the at least one battery cell provided in said battery unit cavity; the at least one battery cell in removable communication with the at least one battery unit; wherein the at least one battery cell may be removed from the battery compartment for a recharging of the at least one battery cell; at least one of the first controller and the first charging port electrically coupled with the at least one battery cell; and the at least one battery cell electrically coupled with the tractor-trailer.

The at least one battery cell having at least one guide channel. The at least one guide channel positioned between a battery cell first side and a battery cell second side, wherein the at least one guide channel provides for the at least one battery cell alignment in the at least one battery unit. The at least one battery cell having at least one electrical connection provided at least in close proximity to a surface of the at least one battery cell. The at least one electrical connection electrically coupled with a trailer connection. The at least one battery cell having an attachment assembly, the attachment assembly being coupled to a battery cell first side and wherein the at least one battery cell may be removed from the battery compartment. The attachment assembly further comprising, at least one of a rod, a hook and a ring. The attachment assembly of claim 1 further comprising, at least one door in communication with at least one of said first side and said oppositely opposed second side. The battery range extender wherein, the at least one door is pivotally attached to at least one of said first side and said oppositely opposed second side. At least one locking mechanism is in close proximity to at least one of the at least one door and the at least one battery unit, providing releasable communication with the at least one battery cell. The at least one battery cell electrically coupled to at least one of an electric motor and a hybrid engine. The first charging port and the first controller electrically coupled to at least one of said electric motor and said hybrid engine. A second charging port and a second controller positioned in close proximity to a back of the trailer.

A method of loading at least one battery cell of a battery range extender system for a tractor-trailer, said tractor-trailer having a trailer; the trailer having an exterior; the method comprising: inserting extensions of a loading device into at least one guide channel of a first battery cell; inserting said first battery cell into a battery compartment, wherein said battery compartment is in fixed communication with said exterior; and moving said first battery cell to first position. Inserting a second battery cell into the battery compartment, wherein the second battery cell exerts a force on the first battery cell. Moving the second battery cell to a second position.

A method of unloading at least one battery cell of a battery range extender system for a tractor-trailer, the tractor-trailer having a trailer; the trailer having an exterior; the method comprising: inserting extensions of a loading device into at least one guide channel of a second battery cell; and removing the second battery cell from a battery compartment, wherein the battery compartment is in fixed communication with the exterior. Removing a first battery cell from the battery compartment, wherein the first battery cell and said second battery cell were in close communication. Attaching a mechanism first end to the first battery cell and a mechanism second end to a vehicle, and advancing the vehicle, wherein the first battery cell is removed from the battery compartment.

The tractor trailer may generally comprise a tractor and a trailer in mechanical communication. The trailer may preferably comprise a storage area having a length $L_1$, battery compartment, landing gear assembly, and rear wheels. The storage area may preferably be comprised of a storage area top, a storage area front, a storage area back, a storage area bottom, a trailer right side and a trailer left side. The storage area bottom may preferably contain a reverse side from the storage area. The landing gear and rear wheels may be preferably in communication with the reverse side of the storage area bottom.

Spanning a length $L_2$, between the landing gear system and the rear wheels, may preferably be the battery compartment. The battery compartment may preferably contain three sections: a lead compartment, a battery bank, and an aft compartment. The lead compartment may preferably extend a predetermined distance from a front of the lead compartment, which is preferably in close proximity to a back side of the landing gear assembly, to the rear of the lead compartment. The predetermined distance of the lead compartment may preferably be five to eight feet. Alternatively, the predetermined distance of the lead compartment may be less than five or maybe be greater than eight feet. The lead compartment may preferably have an aerodynamic cross-section, when viewed from the trailer right side or trailer left side, starting at the rear of the lead compartment and tapering towards a storage area bottom. The lead compartment may preferably possess a parabolic cross-section, when view towards the storage area bottom. Alternatively, the cross-section of the lead compartment, when viewed towards the storage area bottom, may have a polygon shape. A surface of the lead compartment may be preferably uninterrupted by folds or creases. The lead compartment may be preferably in communication with the reverse side of the storage area bottom.

A battery bank front may be in fixed communication with the rear of the lead compartment. The battery bank may extend a predetermined distance towards the rear wheels. The battery bank may be preferably in fixed communication with reverse side of the storage area bottom. Alternatively, the battery bank may be in fixed communication with both the reverse side of the storage area bottom and one or both of the storage area sides.

The battery bank may preferably be in fixed communication with an aft compartment front. The aft compartment may extend a predetermined distance towards the rear wheels. The aft compartment may preferably have a geometric cross-section of a polygon. Alternatively, the aft compartment may possess a triangular cross-section, a half-parabolic cross-section, a square cross-section, or a rectangular cross-section. The aft compartment is preferably in fixed communication with a reverse side of the storage area bottom. Alternatively, the aft compartment may be in fixed communication with both the reverse side of the bottom of the storage area and one or both of storage area sides.

The lead compartment may preferably contain a hinged latch allowing for the storage of various components. Alternatively, the lead compartment may be removable. The aft compartment may preferably contain a hinged latch for the storage of various components. Alternatively, the aft compartment may be removable.

The battery bank may preferably contain four battery units. Alternatively, the battery bank may contain more than four battery unit. Alternatively, the battery bank may contain less than four battery units. Each battery unit may preferably contain two battery cells. Alternatively, each battery unit may contain more than two battery cells. Alternatively, each battery unit may contain less than two battery cells. Adjacent battery units are separated by a volume.

The battery cell may preferably comprise: a battery cell first side, a battery cell second side, a battery cell bottom, a battery cell top side, a first entry side, and a second entry side, which may be preferably combined to form a quadrilateral. The battery cell bottom may preferably house two guide channels. A first entry for each of the guide channels may be provided by openings in the first entry side. A second entry for each of the guide channels may be provided by openings in the second entry side. A first entry edge of the battery cell first side, a first entry edge of the second side, a second entry edge of the first side and a second entry edge of the second side may preferably have the length L6 which define a height of the battery cell. Alternatively, the first entry edge of the battery cell first side, the first entry edge of the second side, the second entry edge of the first side and the second entry edge of the second side may vary in length in order for the battery cell top side to have a parallel orientation with the battery cell bottom.

Electrical connections for the battery cell may be preferably welded, mechanically attached, or molded to an outer surface of the battery cell top side. Alternatively, the electrical connections for the battery cell may be partially encapsulated in the battery cell top side. Alternatively, the electrical connections for the battery cell may be in rotational communication with the battery cell top side. The battery cell may preferably possess two electrical connections between the first entry side and the second entry side at a distance of ½ the length L from the first entry side. One electrical connection may preferably be located in close proximity to the battery cell first side, and one electrical connection may preferably be located in close proximity to the battery cell second side. Alternatively, the battery cell may incorporate less than two electrical connections at a variety of locations on the outer surface of the battery cell top side. Alternatively, the battery cell may incorporate more than two electrical connections at a variety of locations on the outer surface of the battery cell top side.

The guide channels may preferably extend a width of the battery cell and have a rectangular cross-section. Alternatively, the guide channels may have various quadrilateral cross-sections. The battery cell may preferably contain one or more second sections between guide channels, where the number of guide channels is greater than or equal to two. Preferably the guide channels of a battery cell are dimensioned, and spaced apart, to accommodate a forklift or other moving equipment in the industry. Alternatively, the battery cell may contain less than two guide channels. Alternatively, the battery cell may contain more than two guide channels.

At least one, preferably one, attachment assembly may be located on the first entry side, and at least one, preferably one, attachment assembly may be located on the second entry side. The attachment assembly preferably may comprise a cavity, within the first entry side and second entry side, and a rod mounted into the cavity, the rod being coupled to a battery cell first entry side. The orientation of the rod within the cavity may preferably allow for a hooking or clasping assembly to engage the rod. Alternatively, the rod may be a hook or ring. Alternatively, the rod, hook or ring may be in mechanical communication with a first entry side outer surface and the second entry side outer surface. Alternatively, the rod, hook or ring may be in moldable communication with the first entry side outer surface and the second entry side outer surface.

As to the trailer, the storage area bottom may preferably contain an electrical connection. Each electrical connection may preferably be in physical communication with one electrical connection from the battery cell. Alternatively, the electrical connection contained in the storage area bottom may comprise a metal strip contacting electrical connections of multiple battery cells within the battery unit. Alternatively, the electrical connection may comprise a section of metal spanning all or a portion of the trailer storage area width and all or a portion of the trailer storage area length.

The battery compartment may preferably house the battery unit comprised of battery cells. The battery cells rest upon a top surface of the battery compartment base. The battery compartment has a width preferably equal to the trailer storage area width. Alternatively, the width of the battery compartment may be greater than or less than the trailer storage area width. At the extent of the width of the battery compartment, along the right side of the trailer and along the left side of the trailer, each battery unit cavity housing each battery unit may be preferably enclosed with battery compartment doors. Alternatively, one battery compartment door may enclose all battery unit cavities on the right side of the trailer, and one battery compartment door may enclose all battery unit cavities on the left side of the trailer. Alternatively, multiple battery compartment doors may enclose multiple battery unit cavities on one or both sides of the trailer with a number of battery compartment doors on a given side of the trailer being less than the number of enclosed battery unit cavities.

Each battery unit may preferably have a battery unit width less than the battery compartment width. Alternatively, each battery unit may have a battery unit width equal to the battery compartment width. Between each battery compartment door and the battery unit for each battery cell in a battery unit may preferably be two locking mechanisms. The locking mechanisms may preferably reside near the top surface of the battery compartment base. Alternatively, the battery compartment doors may not be present as a feature.

The battery compartment doors may preferably slide in a vertical fashion on both the right side and the left side of the trailer. Alternatively, the battery compartment doors may swing upwards supported with rotating arms. Each battery compartment door may possess two rotating arms per side of the battery compartment door. Alternatively, each battery compartment door may possess less than two, or more than two, rotating arms per side of the battery compartment door.

The action of loading multiple battery cells or a single battery cell may preferably occur on either the right side or the left side of the trailer. A moving vehicle, which possesses the appropriate type and number of extensions, may insert the extensions into the guide channels of a first battery cell. The moving vehicle may include but is not limited to forklifts and other moving equipment. The battery compartment doors may be opened. The moving vehicle may place the first battery cell into the battery unit cavity. The moving vehicle may lift a second battery cell, and move the second battery cell so that the second battery cell exerts a moving force on the first battery cell. The moving force may cause the first battery cell to move to a first battery cell position. The first battery cell may cease movement upon contact with a first locking mechanism system. The first locking mechanism system may preferably automatically lock the first battery cell in the first battery cell position. Alternatively, the first locking mechanism system may be engaged manually. The second battery cell may move into a second battery position. The second battery cell may cease advancement upon contacting a second locking mechanism system. The second locking system automatically locks the second battery cell in the second battery cell position. Alternatively, the second locking mechanism system may be engaged manually.

The first electrical connections of the first battery cell may preferably be in communication with the trailer storage area first electrical connection for the battery unit cavity. With the second battery cell in the second battery cell position, the second electrical connections of the second battery cell may preferably be in communication with the trailer storage area second electrical connection for the battery unit cavity. Alternatively, the battery cell unit may include one battery cell or more than two battery cells. The number of electrical connections may increase with an increase in the number of battery cells employed per battery unit. The closed door for the battery compartment may complete the application of the battery cells to a battery unit cavity.

Regarding removal of the battery cells from the battery unit cavity, a moving vehicle may insert extensions into the guide channels of the second battery cell. The moving vehicle may remove the second battery cell from the battery unity cavity. A first end of an attaching mechanism may be attached to the moving vehicle. The moving vehicle may be a loading device (such as a forklift truck or pallet jack). Placement of attachment mechanism on the moving vehicle may be at any location on the moving vehicle. A second end of the attachment mechanism is attached to the attachment assembly of the first battery cell. The moving vehicle removes the first battery cell with a pulling action. Loading and removal of all battery cells from the battery compartment preferably lasts a duration less than or equal to 15 minutes. Alternatively, the loading and removal of all battery cells from the battery compartment may last a duration greater than 15 minutes.

The battery unit cavity may be preferably defined by battery unit containment barriers. Each battery unit containment barrier may be preferably comprised of one piece. Alternatively, each battery unit containment barrier may be comprised of multiple segments. Each battery unit containment barrier may preferably extend a width equal to or in close proximity to the battery compartment width. Alternatively, each battery unit containment barrier may extend a width which is preferably less than the battery compartment width. At an intersection of the top of the battery compartment and the battery compartment containment barrier top, a battery compartment containment barrier first ledge may extend over the battery unit cavity and battery unit for the respective battery unit cavity for a predetermined distance.

Each trailer storage area electrical connection may be mechanically attached or welded to a battery unit containment barrier first ledge top. Each battery cell electrical connection may be in physical communication with a battery unit containment barrier first ledge bottom. An electrical lead may be mechanically attached or welded to the trailer storage area electrical connection. The electrical lead may extend in a direction towards the tractor. Preferably the connection does not include a battery unit containment barrier second ledge. Alternatively, the connection includes a battery unit containment barrier second ledge, ipsilateral with respect to battery unit containment barrier first ledge, on which each battery cell rests.

Each electrical lead may preferably extend towards the front of the storage area. The electrical leads may preferably end at a first trailer mounted controller. The first trailer mounted controller preferably contains a first external charging port. Alternatively, the first external charging port is separate from the first trailer mounted controller. A connection may preferably provide electrical communication between the first trailer mounted controller and an external electrical adapter. A transfer electrical connection may electrically connect the external electrical adapter with a cab mounted external electrical adapter. The cab mounted external electrical adapter may electrically connect to a cab mounted controller. The cab mounted controller preferably contains a second external charging port. Alternatively, the second external charging port is separate from the cab mounted controller. An electrical network may provide electrical communication between the cab mounted controller and an electric motor or hybrid engine system.

Second electrical leads are mechanically attached or welded to the trailer storage area electrical connection. Each second electrical lead extends towards the storage area back. The second electrical leads preferably will extend within the trailer storage area. Alternatively, the second electrical leads will extend outside the trailer storage area, or within and outside the trailer storage area. The second electrical leads end at a second trailer mounted controller, located in close proximity to the storage area back. The second trailer mounted controller preferably contains a third external charging port. Alternatively, the third external charging port is separate from the second trailer mounted controller.

The battery system described may preferably allow for either the first trailer mounted controller/first external port, the cab mounted controller/second external port, or the second trailer mounted controller/third external port to provide principal communication to the electric motor or hybrid engine system. Alternatively, the battery system as described may allow for a combination of two or all of the first trailer mounted controller/first external port, the cab mounted controller/second external port, or the second trailer mounted controller/third external port to provide principal communication to the electric motor or hybrid engine system. Communication as described allows for the charging of the battery cells in the battery compartment as well as transfer of energy to the electric motor/hybrid engine system.

Further, such communication allows for either or a combination of the first trailer mounted controller/first external port and the second trailer mounted controller/third external port to provide for charging of the battery cells in the battery compartment when the trailer is unhooked from the tractor. This is ideal for when the trailer is positioned at a loading/unloading dock. Where the tractor and trailer are hooked together, the battery system described may preferably allow for the first trailer mounted controller/first external port, the cab mounted controller/second external port, and the second trailer mounted controller/third external port, individually or in combination, to provide for the battery cells in the battery compartment to charge at the same rate as tractor batteries, housed within the electric motor/hybrid engine system.

An intended benefit of the invention is the extension of the range of travel. An unintended benefit of the invention is a range of travel lasting an entire driver "tour of duty", typically an 8-14 hour work shift. Dimensional qualities of the battery system realize unintended benefits of reduced air resistance on the tractor trailer during motion as compared to tractor trailers lacking side fairings. The dimensional qualities of the battery system realize an additional unintended benefit of causing the tractor trailer to have a lower center of gravity due to added weight of the battery system. It is an intended benefit of the invention that the required infrastructure is limited to existing technology at tractor trailer maintenance facilities, truck terminals, warehouses, cross docks, truck stops, or any facility designed for truck/tractor-trailer traffic.

BRIEF DESCRIPTION OF THE DRAWINGS

FIG. 1 is a side view of a tractor trailer containing a battery compartment.

FIG. 2 is a bottom plan view of a tractor trailer containing the battery compartment.

FIG. 3 is a perspective view of a battery cell.

FIG. 4 is a side view of the battery cell.

FIG. 5 is a front side view of the battery cell.

DESCRIPTION OF THE PREFERRED EMBODIMENT

Figure 6:
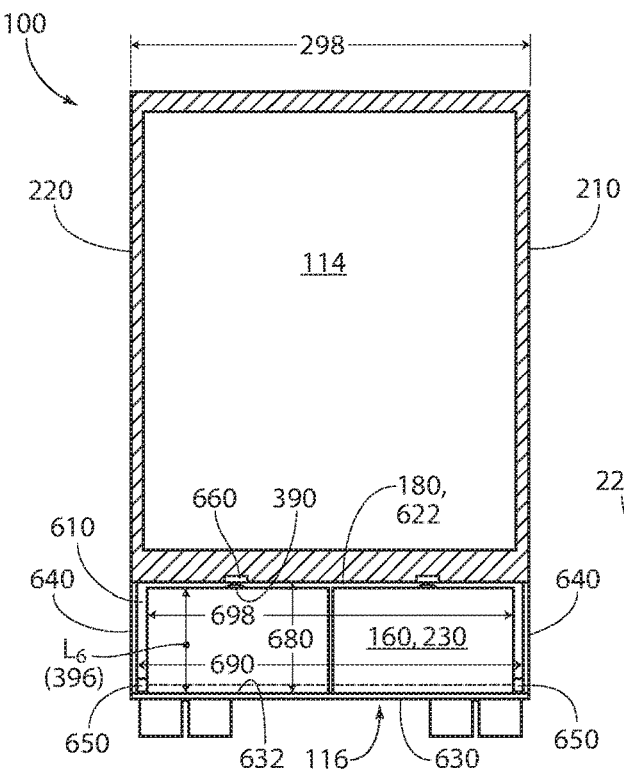
FIG. 6 is a cross-section of a trailer containing the battery compartment.

Although the disclosure hereof is detailed and exact to enable those skilled in the art to practice the invention, the physical embodiments herein disclose merely exemplify the invention which may be embodied in other specific structures. While the preferred embodiment has been described, the details may be changed without departing from the invention, which is defined by the claims.

Now turning to the Figures, FIG. 1 provides a semi-trailer 10 containing a battery system 12 according to the invention. The tractor trailer 10 generally comprises a tractor 102 and a trailer 100 in mechanical communication. The tractor 102 preferably incorporates a chassis 104. The chassis 104 having a front 106 and a back 108. Rotationally attached to the front 106 of the chassis 104 is preferably a set of front wheels 120. Rotationally attached to the back 108 of the chassis 104 are preferably two sets of middle wheels 130. Alternatively, the chassis 104 may contain one set of middle wheels 130. Attached to a top 109 of the chassis 104 is a cab 105. The cab 105 containing a back 188 facing the trailer 100. The cab 105 is attached allowing for the top 109 of the chassis 104 at the back 108 of the chassis 104 to be in movable communication with the trailer 100.

The trailer 100 comprises a storage area 114, battery compartment 116, landing gear assembly 140, and rear wheels 170. The storage area 114 is preferably defined by a storage area top 182, a storage area front 184, a storage area back 186, a storage area bottom 180, and storage area sides 189 (only one storage area side 189 is illustrated in the figure). The storage area front 184 faces the back 188 of the cab 105. The storage area front 184 is physically attached to the storage area bottom 180 such that the storage area bottom 180 is the segment of the trailer 100 in movable communication with the chassis 104. The storage area sides 189 are physically attached to opposing edges of the storage area front 184 and the storage area bottom 180. The storage area back 186 is physically attached to the storage area bottom 180 and the storage area sides 189 such that the storage area front 184 and the storage area back 186 are opposite one another. The storage area top 182 physically attaches to the storage area front 184, the storage area back 186 and the storage area sides 189, opposite the storage area bottom 180. The storage area 114 of the trailer 100 having a trailer storage area length 115, comprising a length $L_1(112)$, from the storage area front 184 to the storage area back 186.

The storage area bottom 180 contains a reverse side 187 from the storage area 114. When the tractor 102 and the trailer 100 are in movable communication, the landing gear assembly 140 is preferably fixed to the reverse side 187 of the storage area bottom 180 in close proximity to the chassis 104. The landing gear assembly 140 preferably contains a landing gear 142 fixed to the reverse side 187 of the storage area bottom 180 in close proximity to the chassis 104. The landing gear assembly 140 may alternatively possess a landing gear support 144, fixed to the landing gear 140 and the reverse side 187 of the storage area bottom 180 for providing additional support for the landing gear assembly 140. Two sets of rear wheels 170 are preferably rotationally attached to the reverse side 187 of the storage area bottom 180 in close relation to the storage area back 186. Alternatively, one set of rear wheels 170 may be rotationally attached to the reverse side 187 of the storage area bottom 180 in close relation to the storage area back 186. A section 192 between the landing gear assembly 140 and the rear wheels amounts to a length $L_2(190)$.

Spanning the length $L_2(190)$ of section 192 is the battery compartment 116. The battery compartment preferably contains three sections: a lead compartment 117, a battery bank 150, and an aft compartment 118. The lead compartment 117 extends a predetermined distance from a front 194 of the lead compartment 117, which is preferably in close proximity to a back side 146 of the landing gear assembly 140, to the rear 195 of the lead compartment 117. The predetermined distance of the lead compartment 117 is preferably five to eight feet. Alternatively, the predetermined distance of the lead compartment may be less than five or maybe be greater than eight feet. The back side 146 of the landing gear assembly 140 faces opposite the tractor 102. The lead compartment 117 preferably has an aerodynamic cross-section, when viewed from the trailer right side or trailer left side, starting at the rear 195 of the lead compartment 117 and tapering towards the storage area bottom 180 while moving towards the front 194 of the rear compartment 117. The lead compartment 117 is in communication with the reverse side 187 of the storage area bottom 180. The lead compartment 117 preferably contains a hinged latch 172 allowing for the storage of various components. Alternatively, the lead compartment 117 is removable allowing for the accumulating of components and reinsertion of the lead compartment 117 for storage. The lead compartment 117 has a width 280 equating to the length $L_3(228)$ at the rear 195 of the lead compartment 117.

A battery bank front 196 is in fixed communication with the rear 195 of the lead compartment 117. The battery bank extends a predetermined distance towards the rear wheels 170 and ends at a battery bank rear 197. The battery bank 150 is preferably in fixed communication with reverse side 187 of the storage area bottom 180. Alternatively, the battery bank 150 is in fixed communication with both the reverse side 187 of the storage area bottom 180 and one or both of the storage area sides 189.

The battery bank 150 is in fixed communication with an aft compartment front 198. The aft compartment 118 extends a predetermined distance towards the rear wheels 170 to an aft compartment rear 199. The aft compartment rear 199 is in close proximity to the rear wheels 170. The aft compartment 118 has a geometric cross-section of a polygon. Alternatively, the aft compartment 118 may possess a triangular cross-section, a half-parabolic cross-section, a square cross-section, or a rectangular cross-section. The aft compartment 118 is preferably in fixed communication with reverse side 187 of the storage area bottom 180. Alternatively, the aft compartment is in fixed communication with both the reverse side 187 of the bottom 180 of the storage area 114 and one or both of storage area sides 189. The aft compartment 118 preferably contains a hinged latch 172 allowing for the storage of various components. Alternatively, the aft compartment 118 is removable allowing for the accumulating of components and reinsertion of the aft compartment 118 for storage.

The battery bank 150 contains a number of battery units 160. The battery bank 150 preferably contains four battery units 160. Alternatively, the battery bank 150 may contain more than four battery units 160. Alternatively, the battery bank 150 may contain less than four battery units 160.

FIG. 2 is a bottom view of the trailer 100, which illustrates the storage area sides 189 separately as a trailer right side 210 and an opposite trailer left side 220 of the trailer 100. A distance between the trailer right side 210 and the trailer left side 220 is a length $L_3$ (228). The length $L_3$ (228) equates to a trailer storage area width 298. Each battery unit 160 preferably contains two battery cells 230. Alternatively, each battery unit 160 may contain more than two battery cells 230. Alternatively, each battery unit 150 may contain less than two battery cells 230. Adjacent battery units 160 are separated by a volume 260. The dimension 270 of the volume 260 between consecutive battery units 160 has a length $L_4$(240). The volume 260 may be comprised of air or another material. A volume 260 is preferably located between consecutive battery bank units 160. Alternatively, volume 260 may be intermittently applied or not applied in the entirety.

The lead compartment 117 preferably possesses a parabolic cross-section 250, when view towards the storage area bottom 180. Alternatively, the cross-section 250 of the lead compartment, when viewed towards the storage area bottom 180, has a polygon shape. A surface 290 of the lead compartment 117 is preferably uninterrupted by folds or creases. Alternatively, the surface 290 of the lead compartment 117 may be interrupted by folds and creases, across the width 296 of the lead compartment 117, which form sides of the lead compartment 117.

Dimensional qualities of the battery system realize unintended benefits of reduced air resistance on the tractor trailer during motion as compared to tractor trailers lacking side fairings. The dimensional qualities of the battery system realize an additional unintended benefit of causing the tractor trailer to have a lower center of gravity due to added weight of the battery system.

Addressing FIG. 3 and FIG. 4, the preferred embodiment of the battery cell 230 comprises the following. The battery cell 230 comprises: a battery cell first side 310, a battery cell second side 320, a battery cell bottom 330, a battery cell top side 340, a first entry side 350, and a second entry side 360, which are combined to form a quadrilateral. The battery cell bottom 330 contains a first entry edge 302 and an opposite second entry edge 304 separated by a first edge 332 and an opposite second edge 370 of the battery cell bottom 330, each having a length $L_5$ (392). Alternatively, the lengths of the first edge 332 and the second edge 370 may differ. The battery cell bottom 330 preferably houses two guide channels 380 extending from the first entry edge 302 to the second entry edge 304. A first entry 420 for each of the guide channels 380 is provided by openings 384 in the first entry side 350. A second entry 432 for each of the guide channels 380 is provided by openings 384 in the second entry side 360. The battery cell bottom 230 is molded, mechanically attached, or welded to the battery cell first side 230 at the first edge 332. An intersection 336 of the battery cell bottom 330 and the battery cell first side 310 forms a preferably equal to ninety degrees. Alternatively, the intersection 336 between the battery cell bottom 330 and the battery cell first side 310 may be less than ninety degrees or greater than ninety degrees.

The battery cell bottom 330 is molded, mechanically attached, or welded to the battery cell second side 320 at the second edge 370 of the battery cell bottom 330. The second edge 370 is positioned opposite the first edge on the plane 334 of the battery cell bottom 330. An intersection 338 of the battery cell bottom 330 and the battery cell second side 320 forms a preferably equal to ninety degrees. Alternatively, the intersection 338 between the battery cell bottom 330 and the battery cell second side 320 may be less than ninety degrees or greater than ninety degrees. The battery cell first side 310 and the battery cell second side 320 are ipsilateral, as to one another, with respect to the battery cell bottom 330.

The first entry side 350 is molded, mechanically attached, or welded to: the battery cell bottom 330 at the first entry edge 302, the first entry edge 312 of the battery cell first side 310, and the first entry edge 314 of the second side 320. The first entry side 350 contains openings 384 corresponding to the guide channels 380 in the battery cell bottom side 330. The second entry side 360 is molded, mechanically attached, or welded to: the battery cell bottom 330 at the second entry edge 304, the second entry edge 316 of the battery cell first side 310 and the second entry edge 318 of the battery cell second side 320. The first entry edge 312 of the battery cell first side 310, the first entry edge 314 of the second side 320, the second entry edge 316 of the first side 310 and the second entry edge 318 of the second side 320 preferably have the length $L_6$(396) which define a height of the battery cell 230. Alternatively, The first entry edge 312 of the battery cell first side 310, the first entry edge 314 of the second side 320, the second entry edge 316 of the first side 310 and the second entry edge 318 of the second side 320 may vary in length in order for the battery cell top side 340 to have a parallel orientation with the battery cell bottom 330.

The battery cell first side 310 and the battery cell second side 320 are preferably separated by a length $L_7$(398) through the entirety of the length $L_6$(396). Alternatively, the battery cell first side 310 and the battery cell second side 320 may be separated by a variable length through the length $L_6$(396). The second entry side 360 contains openings (not shown in FIG. 3) corresponding to the guide channels 380 in the battery cell bottom 330. The battery cell top side 340 is molded, mechanically attached, or welded to the geometry created by the intersection is the battery cell first side 310, battery cell second side 320, first entry side 350, second entry side 360 and the battery cell bottom 330, opposite the bottom 330. Application of the top side 340 creates the battery cell 230.

At least one, preferably one, attachment assembly 362 is located on the first entry side 350, and at least one, preferably one, attachment assembly 362 is located on the second entry side 360. The at least one, preferably one, attachment assembly 362 on the first entry side 350 and second entry side 360 is preferably located in close proximity to the cell bottom 330 and at a median location between the battery cell first side 310 and the battery cell second side 320. Alternatively, the at least one, preferably one, attachment assembly 362 on the first entry side 350 and second entry side 360 is located at any location on the first entry side 350 and second entry side 360. The attachment assembly 362 preferably comprises a cavity 364, within the first entry side 350 and side entry side 360, and a rod 368 mounted into the cavity 364. The orientation of the rod 368 within the cavity allowing for a hooking or clasping assembly to engage the rod. Alternatively, the rod 368 may be a hook or ring. Alternatively, the rod 368, hook or ring may be in mechanical communication with a first entry side outer surface 354 and the second entry side outer surface (not illustrated in the figures). Alternatively, the rod 368, hook or ring may be in moldable communication with the first entry side outer surface 354 and the second entry side outer surface (not illustrated in the figures).

Electrical connections 390 for the battery cell 230 are preferably welded, mechanically attached, or molded to an outer surface 342 of the battery cell top side 340. Alternatively, the electrical connections 390 for the battery cell 230 may be partially encapsulated in the battery cell top side 340. Alternatively, the electrical connections 390 for the battery cell 230 may be in rotational communication with the battery cell top side 340. The battery cell 230 preferably possesses two electrical connections 390 located between the first entry side 350 and the second entry side 360 at a distance of ½ the length $L_5$(392) from the first entry side 350. One electrical connection 390 is preferably located in close proximity to the battery cell first side 310, and one electrical connection 390 is preferably located in close proximity to the battery cell second side 320. Alternatively, the battery cell 230 may incorporate less than two electrical connections 390 at a variety of locations on the outer surface 342 of the battery cell top side 340. Alternatively, the battery cell 230 may incorporate more than two electrical connections 390 at a variety of locations on the outer surface 342 of the battery cell top side 340.

Focusing on FIG. 4 and FIG. 5, the guide channels 380 extend a width 408 of the battery cell 230. The guide channels 380 preferably have a rectangular cross-section 560. Commencing of the rectangular cross-section 560 preferably occurs a length $L_{10}$(520) from the battery cell first side 310. The length $L_{10}$(520) preferably is constant through the width 408 of the battery cell 230. Alternatively, the length $L_{10}$(520) may vary through the width 408 of the battery cell 230. The cross-section 560 of the guide channel 380 commences at the distance $L_{10}$(520) from the first side 310 with a first height 512 extending a length $L_8$(514), which equates to a guide channel first height 512, into the cavity 404 of the battery cell 230 from the battery cell bottom 330. The guide channel first height 512 preferably maintains the length $L_8$(514) through the width 408 of the battery cell 230. Alternatively, the of the guide channel first height 512 varies along the width 408 of the battery cell 230. The first height 512 is intersected at the length $L_8$(514), or a variation of the guide channel first height 512, from the battery cell bottom 330 with a guide channel top 550.

The guide channel top 550 preferably intersects the first height 512 at a ninety degree angle. Alternatively, the guide channel top 550 intersects the first height 512 at an angle greater than ninety degrees or at an angle less than ninety degrees. The guide channel top 550 extends a length $L_9$(510) directed away from the battery cell first side 310. The length $L_9$(510) preferably remains constant through the width 408 of the battery cell 230. Alternatively, the guide channel top 550 may vary in the length $L_9$(510) through the width 408 of the battery cell 230. At the length $L_9$(510) a second height 570 intersects the guide channel top 550, and extends a length $L_{12}$(574) towards the battery cell bottom 330. The second height 570 preferably intersects the guide channel top 550 at a ninety degree angle. Alternatively, the second height 570 intersects the guide channel top 550 at an angle greater than ninety degrees or at an angle less than ninety degrees. The second height 570 preferably maintains the length $L_{12}$(574) through the width 408 of the battery cell 230. Alternatively, the second height 512 of the guide channels 380 varies along the along the width 408 of the battery cell 230.

The second height 570 intersects a second section 582 of the battery cell bottom 330. The second section 582 of the battery cell bottom 330 has a length $L_{11}$(530) which is preferably constant over the width 408 of the battery cell 230. Alternatively, the length $L_{11}$(530) may vary over the width 408 of the battery cell 310. At the length $L_{11}$(530) the bottom mechanically interacts with a second guide channel 590 or the battery cell second side 320. The cross-section 560 mechanical relationship continues until the battery cell second side 320 is contacted. The battery cell 230 preferably contains two guide channels 380. Preferably the length $L_{11}$(530) is of a dimension accommodating a forklift or other moving equipment in the industry. Alternatively, the battery cell 230 may contain less than two guide channels 380. Alternatively, the battery cell 230 may contain more than two guide channels 380. Thus, the battery cell 230, alternatively, may contain more than one second section 582, where the number of guide channels 380 is greater than two.

Turning to FIG. 6, which illustrates a cross sectional view of the trailer 100 containing a battery compartment 116 and the trailer storage area 114. The storage area bottom 180 contains an electrical connection 660. Each electrical connection 660 is preferably in physical communication with one electrical connection 390 from the battery cell 230. Alternatively, the electrical connection 660 may comprise a metal strip (not shown in the figures) spanning the trailer storage area width 298 or a distance less than the length $L_3$(228) of the trailer storage area width 298 of the trailer 100 such that the metal strip (not shown in the figures) contacts electrical connections 390 of multiple battery cells 230 within the battery unit 160. Alternatively, the electrical connection 660 may comprise a section of metal spanning all or a portion of the trailer storage area width 298 and all or a portion of the trailer storage area length 115.

The battery compartment 116 houses the battery unit 160 comprised of battery cells 230. The battery compartment 116 comprises a top 622 which amounts to the storage area bottom 180. Mechanically attached or welded to the top 622 of the battery compartment 116 is a frame structure (not shown in the figures) having a height 680 equal to or slightly greater than the length L6(396) of the battery cell 230. Mechanically attached or welded to the frame structure (not shown in the figures) is a battery compartment base 630. The battery cells 230 rest upon a top surface 632 of the battery compartment base 630. The battery compartment 116 has a width 690 preferably equal to the trailer storage area width 298. Alternatively, the width 690 of the battery compartment 116 may be greater than or less than the trailer storage area width 298.

At the extent of the width 690 of the battery compartment 116, along the right side 210 of the trailer and along the left side 220 of the trailer 100, each battery unit cavity 610 housing each battery unit 160 is enclosed with battery compartment doors 640. Alternatively, one battery compartment door 640 encloses all battery unit cavities 610 on the right side 210 of the trailer 100, and one battery compartment door 640 encloses all battery unit cavities 610 on the left side 220 of the trailer 100. Alternatively, multiple battery compartment doors 640 enclose multiple battery unit cavities 610 on one or both sides of the trailer 100 with a number of battery compartment doors 640 on a given side of the trailer 100 being less than the number of enclosed battery unit cavities 610.

Each battery unit 160 preferably has a battery unit width 698 less than the battery compartment width 690. Alternatively, each battery unit 160 may have a battery unit width 698 equal to the battery compartment width 690. Between each battery compartment door 640 and the battery unit 160 for each battery cell 230 in a battery unit 116 is preferably two locking mechanisms 650. The locking mechanisms preferably reside near the top surface 632 of the battery compartment base 630. Alternatively, the battery compartment doors 640 may not be present as a feature.

Figure 7:
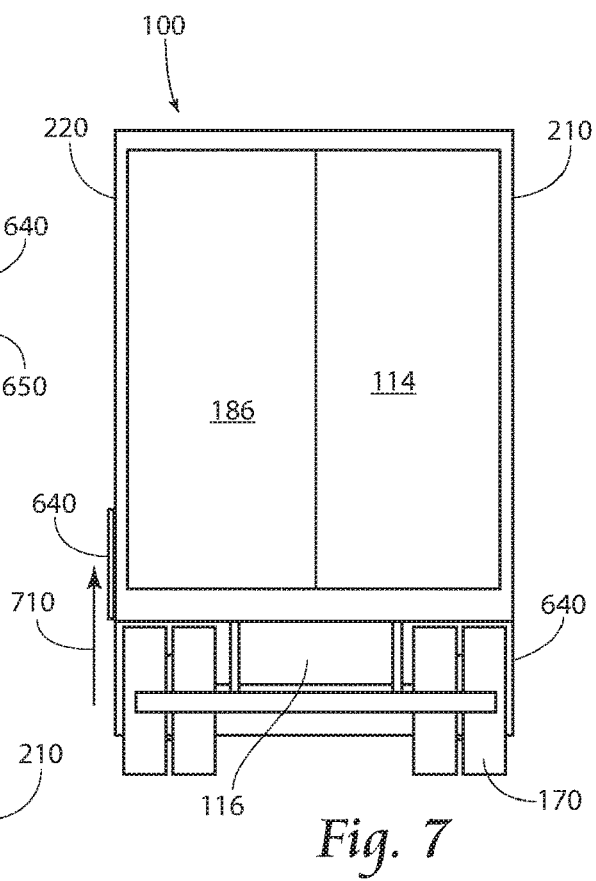
FIG. 7 is a rear view of the trailer containing the battery compartment.
Figure 8:
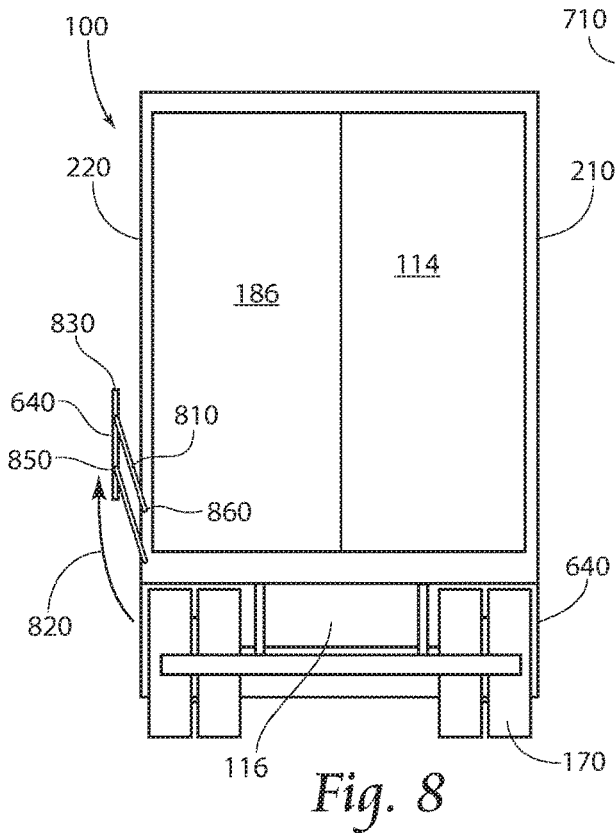
FIG. 8 is a rear view of the trailer containing the battery compartment.
Figure 9:
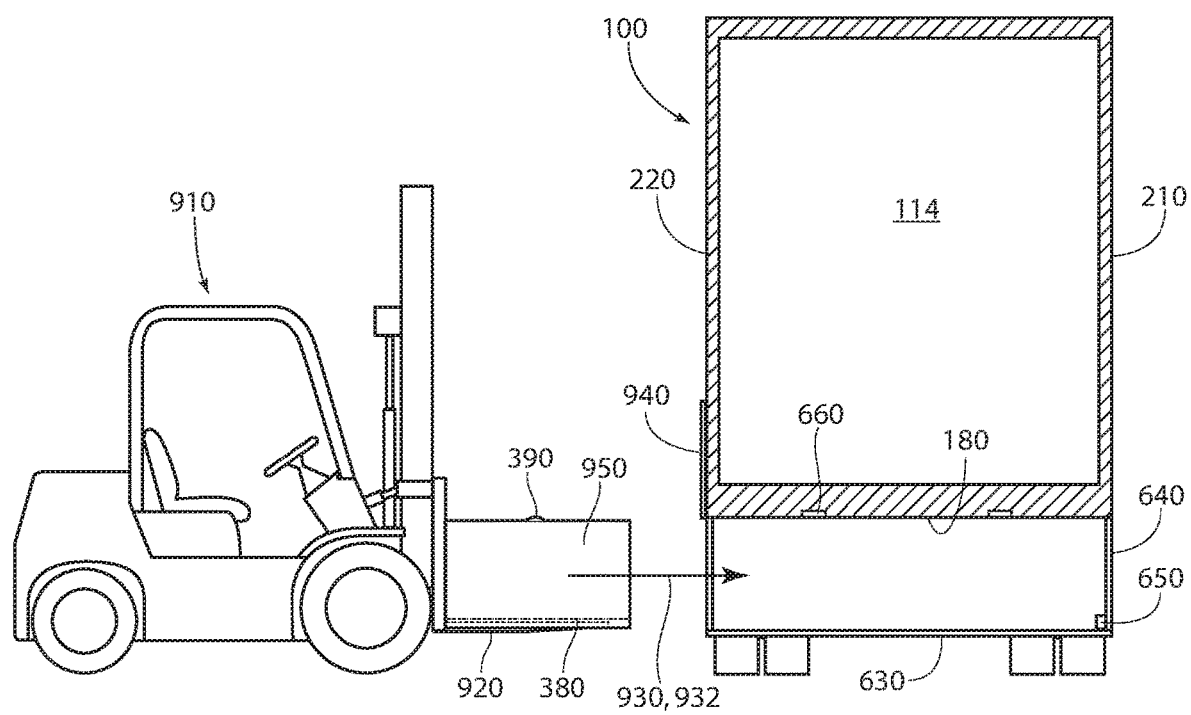
FIG. 9 is a cross-section of the trailer and the battery compartment, with the loading of a first battery cell into a battery unit of the battery compartment of the trailer.

Moving to FIG. 7 and FIG. 8, the battery compartment doors 640 preferably slide in a vertical fashion 710. The battery compartment doors 640 preferably slide vertically 710 on both the right side 210 and the left side 220 of the trailer 100. Alternatively, the battery compartment doors 640 may swing upwards 820. In swinging upwards 820, the battery compartment doors 640 may be supported with rotating arms 810. The rotating arm 810 is rotationally in communication with a side 830 of each battery compartment door 640 on one side 850 of the rotating arm 810. An opposite side 860 of the rotating arm 810 is rotationally attached to the right side 210 or left side 220 of the trailer 100. Preferably each battery compartment door 640 possesses two rotating arms 810 per side 830 of the battery compartment door 640. Alternatively, each battery compartment door 640 possesses less than two, or more than two, rotating arms 810 per side 830 of the battery compartment door 640.

FIG. 9, FIG. 10, FIG. 11, and FIG. 12 illustrate the loading of multiple battery cells 230 into a battery unit cavity 610. The action of loading multiple battery cells 230 or a single battery cell 230 can occur on either the right side 210 or the left side 220 of the trailer 100. The action of loading a first battery cell 950 into a battery unit cavity 610 commences with a moving vehicle 910 which possesses the appropriate type and number of extensions 920. The moving vehicle 910 includes but is not limited to forklifts and other moving equipment. The appropriateness of the extensions depend the extension 920 dimensions, number of extensions 920, number of guide channels 380, and location of the guide channels 380 along the bottom 330 of the first battery cell 950. The moving vehicle 910 inserts the extensions 920 into the guide channels 380 of a first battery cell 950. The battery compartment doors 640 are opened 940. The moving vehicle 910 places 930 the first battery cell 950 into the battery unit cavity 610. The moving vehicle may apply a force 932 in some manner to encourage the placing 930 of the first battery cell 950 in to the battery unit cavity 610.

Figure 10:
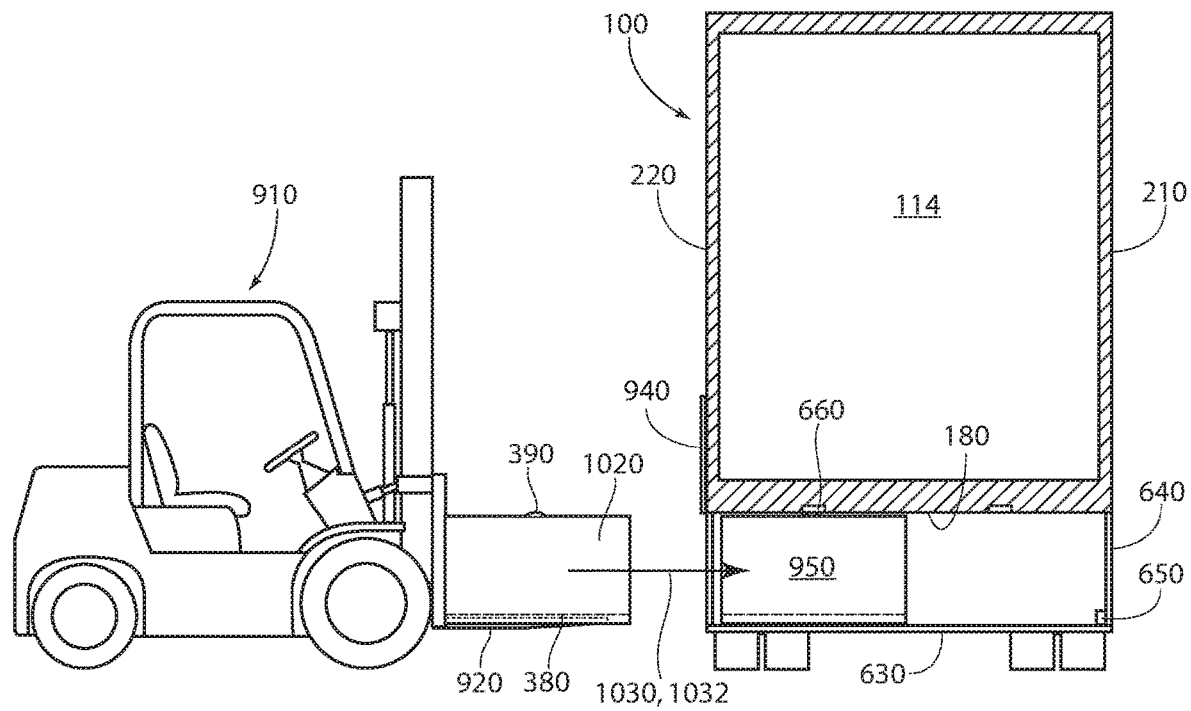
FIG. 10 is a cross-section of the trailer and the battery compartment, with the loading of a second battery cell into the battery unit of the battery compartment of the trailer.
Figure 11:
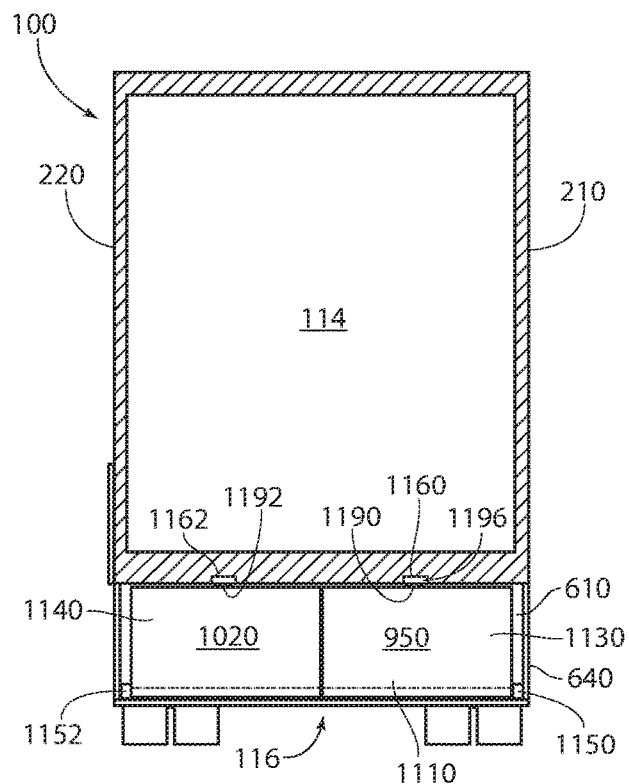
FIG. 11 is a cross-section of the trailer, and the battery compartment containing the first battery cell and the second battery cell, where a battery compartment door remains open.

FIG. 10 illustrates the application of multiple battery cells 230 into a battery unit 160. The battery compartment 116 door remains open 1040. The moving vehicle 910 lifts a second battery cell 1020, and moves 1030 the second battery cell 1020 so that the second battery cell 1020 exerts a moving force 1032 on the first battery cell 950. As illustrated in FIG. 11, the moving force 1032 causes the first battery cell 950 to move to a first battery cell position 1130. The first battery cell 950 ceases movement upon contact with a first locking mechanism system 1150. The first locking mechanism system 1150 automatically locks the first battery cell 950 in the first battery cell position 1130. Alternatively, the first locking mechanism system 1150 may be engaged manually. The second battery cell 1020 moves into a second battery position 1140. The second battery cell 1020 ceases advancement upon the first entry side 350 or second entry side 360 contacting a second locking mechanism system 1152. The second locking system 1152 automatically locks the second battery cell 1020 in the second battery cell position 1140. Alternatively, the second locking mechanism system 1152 may be engaged manually.

Figure 12:
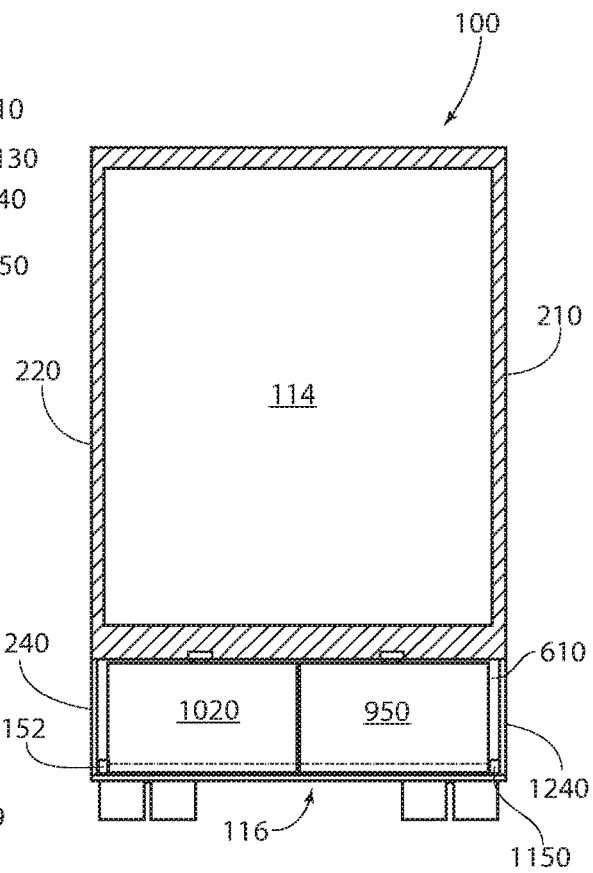
FIG. 12 is a cross-section of the trailer, and the battery compartment containing the first battery cell and the second battery cell, where a battery compartment door is closed.

With the first battery cell 950 in the first battery cell position 1130, the first electrical connections 1190 of the first battery cell 950 are in communication with the trailer storage area 114 first electrical connection 1160 for the battery unit cavity 610, housed in the top 622 of the battery compartment 116. With the second battery cell 1020 in the second battery cell position 1140, the second electrical connections 1192 of the second battery cell 1020 are in communication with the trailer storage area 116 second electrical connection 1162 for the battery unit cavity 610, housed in the top 622 of the battery compartment 116. Alternatively, the battery cell unit 160 may include one battery cell 230 or more than two battery cells 230. The number of electrical connections 1196 increase with an increase in the number of battery cells 230 employed per battery unit 160. As illustrated in FIG. 12, the closed door 1240 for the battery compartment 116 completes the application of the battery cells (950, 1020) to a battery unit cavity 610.

Figure 14:
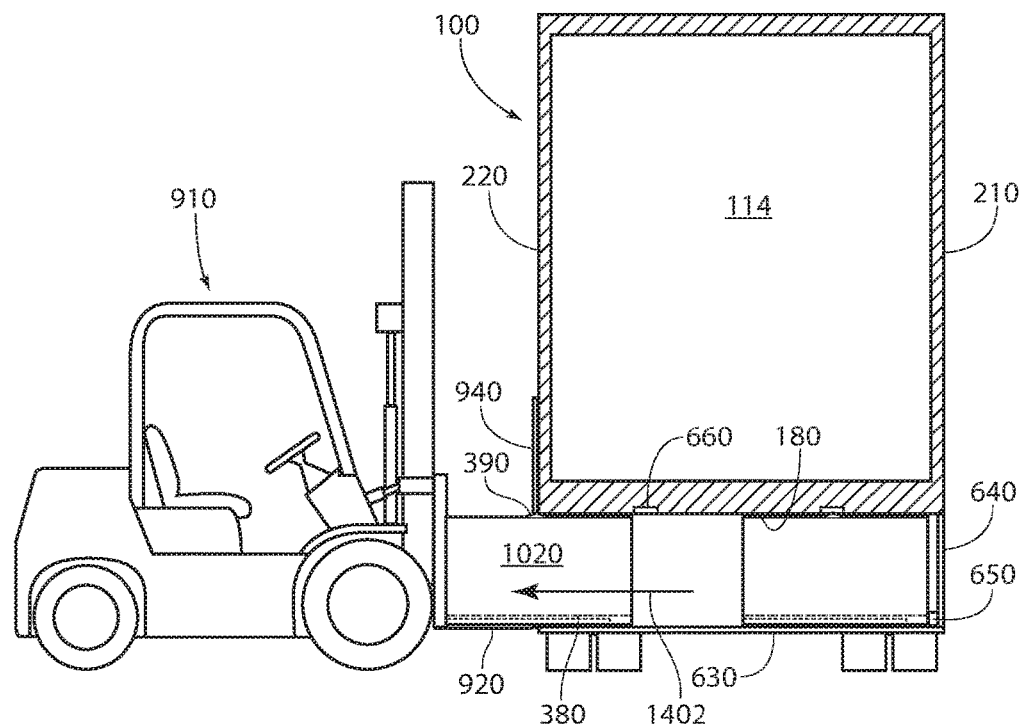
FIG. 14 is a cross-section of the trailer, and the battery compartment containing the first battery cell and the second battery cell, where a moving vehicle removes the second battery cell.
Figure 15:
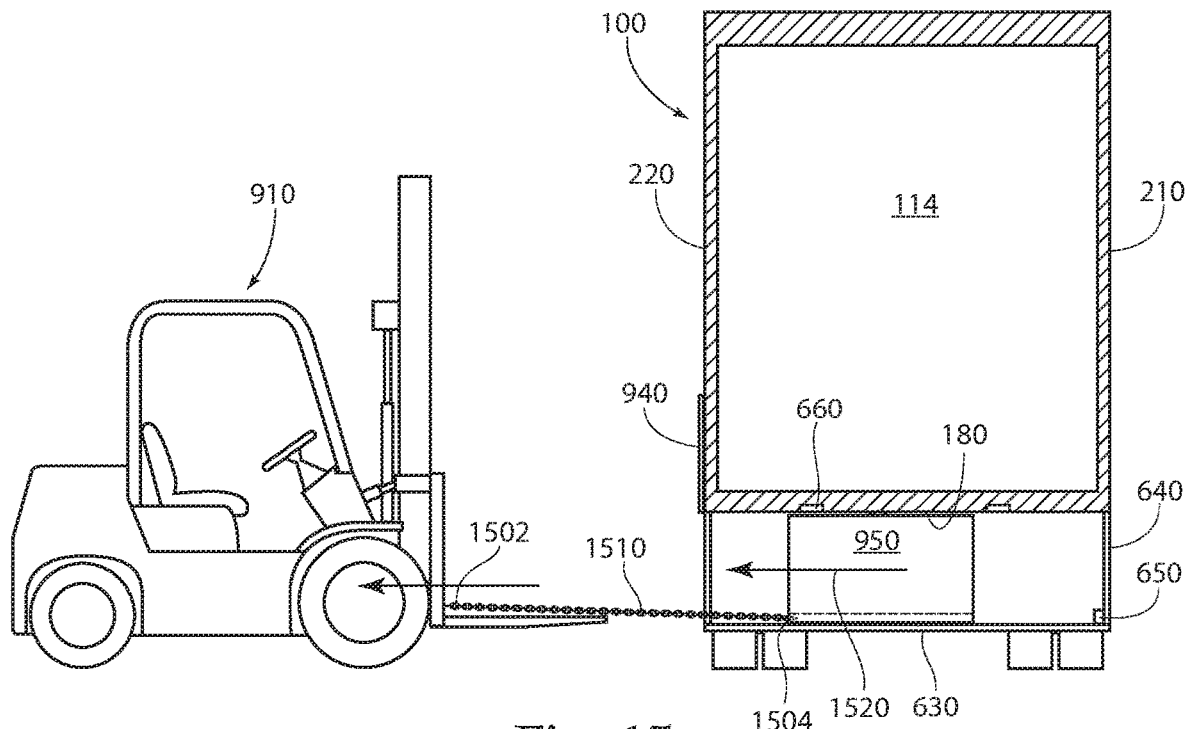
FIG. 15 is a cross-section of the trailer, and the battery compartment containing the first battery cell, where the moving vehicle employs an attaching mechanism to remove the first battery cell.

FIG. 14 and FIG. 15 illustrate removal of the battery cells (950, 1020) from the battery unit cavity 610. In FIG. 14, a moving vehicle 910 inserts extensions 920 into the guide channels 380 of the second battery cell 1020. The moving vehicle 910 removes 1402 the second battery cell 1020 from the battery unity cavity 610. In FIG. 15, a first end 1502 of an attaching mechanism 1510 is attached to the moving vehicle 910. Placement of attachment mechanism 1510 on the moving vehicle 910 may be at any location on the moving vehicle 910. A second end 1504 of the attachment mechanism 1510 is attached to the attachment assembly 362 of the first battery cell 950. The moving vehicle 910 removes the first battery cell 950 with a pulling action 1520.

Loading and removal of all battery cells 230 from the battery compartment 116 preferably lasts a duration less than or equal to 15 minutes. Alternatively, the loading and removal of all battery cells 230 from the battery compartment 116 may last a duration greater than 15 minutes.

Figure 13:
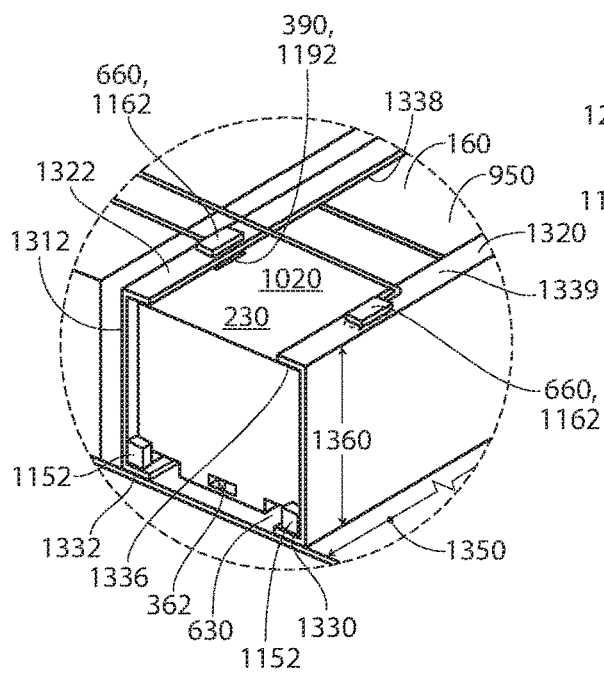
FIG. 13 is a perspective view of a battery unit housed in a battery unit cavity.
Figure 16:
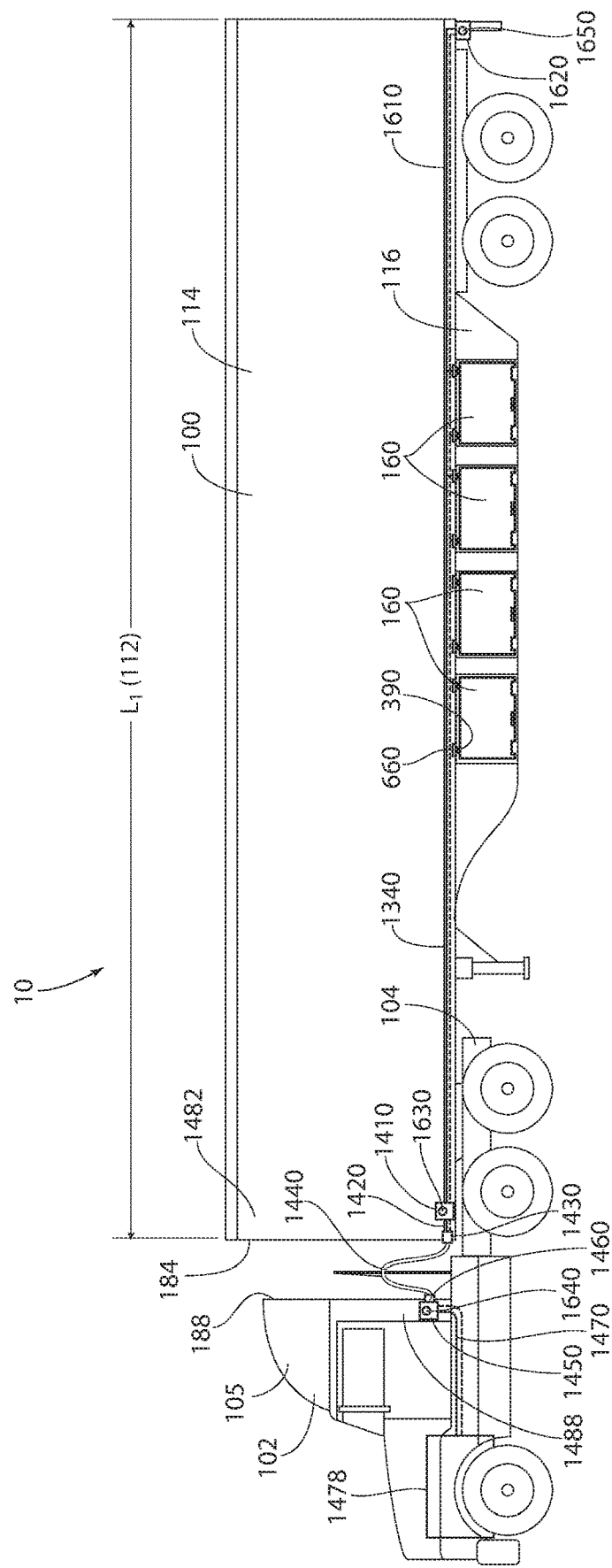
FIG. 16 is a side view of the tractor trailer containing the battery system.

FIG. 13 and FIG. 16 illustrate electrical connectivity of the battery cells 230 to the tractor trailer 10. FIG. 13 illustrates the electrical connectivity regarding individual battery units 160 and battery cells 230. The first battery cell 950 and the second battery cell 1020 are positioned as a battery unit 160 occupying the battery unit cavity 610. The battery unit cavity 610 is preferably defined by battery unit containment barriers (1310, 1312). Each battery unit containment barrier (1310, 1312) is preferably comprised of one piece. Alternatively, each battery unit containment barrier (1310, 1312) may be comprised of multiple segments. Each battery unit containment barrier (1310, 1312) preferably extends a width 1350 equal to or in close proximity to the battery compartment width 690. Alternatively, each battery unit containment barrier (1310, 1312) extends a width 1350 which is preferably less than the battery compartment width 690. Each battery unit containment barrier (1310, 1312) preferably possesses a height 1360 equivalent to the height 680 of the battery containment frame structure (not shown in the figure). At an intersection (not shown in the figure) of the top 622 of the battery compartment 116 and the battery compartment containment barrier top 1336, a battery compartment containment barrier first ledge (1320, 1322) extends over the battery unit cavity 610 and battery unit 160 for the respective battery unit cavity 610 for a predetermined distance. Each trailer storage area 114 electrical connection (660, 1160, 1162) is mechanically attached or welded to a battery unit containment barrier first ledge top 1339. Each battery cell electrical connection (390, 1190, 1192) is in physical communication with a battery unit containment barrier first ledge bottom 1338. An electrical lead 1340 is mechanically attached or welded to the trailer storage area electrical connection (610, 1160, 1162). The electrical lead extends in a direction towards the tractor 102 (not shown in the figure). Opposite the battery unit containment barrier top 1336 is a connection 1380 between each battery unit containment barrier (1310, 1312) and the battery compartment base 630. Preferably the connection 1380 does not include a battery unit containment barrier second ledge (1330, 1332). Alternatively, the connection 1380 includes a battery unit containment barrier second ledge (1330, 1332), ipsilateral with respect to battery unit containment barrier first ledge (1320, 1322), on which each battery cell 230 rests.

FIG. 16 illustrates the electrical connection between the battery cells 230 and an electric motor or hybrid motor 1478. Each electrical lead 1340 extends towards the front of the storage area 184. The electrical leads 1340 preferably will extend within the trailer storage area 114. Alternatively, the electrical leads 1340 will extend outside the trailer storage area 114, or within and outside the trailer storage area 114. The electrical leads 1340 end at a first trailer mounted controller 1410. The first trailer mounted controller 1410 preferably contains a first external charging port 1630. Alternatively, the first external charging port 1630 is separate from the first trailer mounted controller 1410. An external electrical adapter 1430 for the trailer 100, is mechanically attached to the trailer exterior 1482. Alternatively, the external electrical adapter 1430 may be housed partially on the trailer exterior 1482 and partially within the trailer storage area 114. A connection 1420 provides electrical communication between the first trailer mounted controller 1410 and the external electrical adapter 1430. A cab mounted external electrical adapter 1460 is mechanically attached to the back 188 of the cab 105. Alternatively, the cab mounted external electrical adapter 1460 may be housed partially on the cab exterior 1488 and partially within the cab 105. Alternatively, the cab mounted external adapter 1460 may be mechanically attached to the chassis 104. A transfer electrical connection 1440 electrically connects the external electrical adapter 1430 with the cab mounted external electrical adapter 1460. The cab mounted external electrical adapter 1460 electrically connects to a cab mounted controller 1450. The cab mounted controller 1450 preferably contains a second external charging port 1640. Alternatively, the second external charging port 1640 is separate from the cab mounted controller 1450. An electrical network 1470 provides electrical communication between the cab mounted controller 1460 and an electric motor or hybrid engine system 1478. The battery system 12 described allows for either the trailer mounted controller 1410 or the cab mounted controller 1450 to provide principal communication to the electric motor or hybrid engine system 1478.

Second electrical leads 1610 are mechanically attached or welded to the trailer storage area electrical connection (610, 1160, 1162). Each second electrical lead 1610 extends towards the storage area back 186. The electrical leads 1610 preferably will extend within the trailer storage area 114. Alternatively, the second electrical leads 1610 will extend outside the trailer storage area 114, or within and outside the trailer storage area 114. The second electrical leads 1610 end at a second trailer mounted controller 1620, located in close proximity to the storage area back. The second trailer mounted controller 1620 preferably contains a third external charging port 1650. Alternatively, the third external charging port 1650 is separate from the second trailer mounted controller 1620. The second trailer mounted controller 1620 preferably contains a third external charging port 1650. Alternatively, the third external charging port 1650 is separate from the second trailer mounted controller 1620.

The battery system 12 described preferably allows for either the first trailer mounted controller 1410/first external port 1630, the cab mounted controller 1450/second external port 1640, or the second trailer mounted controller 1620/third external port 1650 to provide principal communication to the electric motor/hybrid engine system 1478. Alternatively, the battery system 12 as described may allow for a combination of two or all of the first trailer mounted controller 1410/first external port 1630, the cab mounted controller 1450/second external port 1640, or the second trailer mounted controller 1620/third external port 1650 to provide principal communication to the electric motor/hybrid engine system 1478. Communication as described allows for the charging of the battery cells 230 in the battery compartment 116 as well as transfer of energy to the electric motor/hybrid engine system 1478.

Further, such communication allows for either or a combination of the first trailer mounted controller 1410/first external port 1630 and the second trailer mounted controller 1620/third external port 1650 to provide for charging of the battery cells 230 in the battery compartment 116 when the trailer 100 is unhooked from the tractor 102. This is ideal for when the trailer 100 is positioned at a loading/unloading dock. Where the tractor 102 and trailer 100 are hooked together, the battery system 12 described may preferably allow for the first trailer mounted controller 1410/first external port 1630, the cab mounted controller 1450/second external port 1640, and the second trailer mounted controller 1620/third external port 1650, individually or in combination, to provide for the battery cells 230 in the battery compartment 116 to charge at the same rate as tractor batteries (not illustrated in the figures), housed within the electric motor/hybrid engine system 1478.

An intended benefit of the invention is the extension of the range of travel. An unintended benefit of the invention is a range of travel lasting an entire driver "tour of duty", typically an 8-14 hour work shift. Dimensional qualities of the battery system realize unintended benefits of reduced air resistance on the tractor trailer during motion as compared to tractor trailers lacking side fairings. The dimensional qualities of the battery system realize an additional unintended benefit of causing the tractor trailer to have a lower center of gravity due to added weight of the battery system.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention. Finally, it is an intended benefit of the invention that the infrastructure for charging is limited to existing technology at tractor trailer 10 maintenance facilities, truck terminals, warehouses, cross docks, truck stops, or any facility designed for truck/tractor-trailer traffic.

We claim:

1. A battery range extender system for a tractor-trailer, said tractor-trailer having a trailer; said trailer having an exterior; said battery range extender system comprising:
   a battery compartment, at least one battery cell, a first controller, and a first charging port, wherein said battery compartment is in fixed communication with said exterior;
   said battery compartment comprising at least one battery unit;
   said at least one battery unit having a battery unit cavity defined by a first side and an oppositely opposed second side;
   at least one door in communication with at least one of said first side and said oppositely opposed second side;
   said at least one battery cell provided in said battery unit cavity;
   said at least one battery cell in removable communication with said at least one battery unit; wherein said at least one battery cell may be removed from said battery compartment for a recharging of said at least one battery cell;
   at least one of said first controller and said first charging port electrically coupled with said at least one battery cell; and
   said at least one battery cell electrically coupled with said tractor-trailer.

2. The battery range extender system of claim 1 further comprising, said at least one battery cell having at least one guide channel.

3. The battery range extender system of claim 2 further comprising, said at least one guide channel positioned between a battery cell first side and a battery cell second side, wherein said at least one guide channel provides for said at least one battery cell alignment in said at least one battery unit.

4. The battery range extender system of claim 1 further comprising, said at least one battery cell having at least one electrical connection provided at least in close proximity to a surface of said at least one battery cell.

5. The battery range extender of claim 4 further comprising, said at least one electrical connection electrically coupled with a trailer connection.

6. The battery range extender system of claim 1 further comprising said at least one battery cell having an attachment assembly, said attachment assembly being coupled to a battery cell first side and wherein said at least one battery cell may be removed from said battery compartment.

7. The attachment assembly of claim 6 further comprising, at least one of a rod, a hook and a ring.

8. The battery range extender of claim 1 wherein, said at least one door is pivotally attached to at least one of said first side and said oppositely opposed second side.

9. The battery range extender of claim 1 further comprising, at least one locking mechanism in close proximity to at least one of said at least one door and said at least one battery unit, providing releasable communication with said at least one battery cell.

10. The battery range extender of claim 1 further comprising, said at least one battery cell electrically coupled to at least one of an electric motor and a hybrid engine.

11. The battery range extender of claim 10 further comprising said first charging port and said first controller electrically coupled to at least one of said electric motor and said hybrid engine.

12. The battery range extender of claim 10 further comprising a second charging port and a second controller positioned in close proximity to a back of said trailer.

13. A method of loading at least one battery cell of a battery range extender system for a tractor-trailer, said tractor-trailer having a trailer; said trailer having an exterior; said method comprising:
- inserting extensions of a loading device into at least one guide channel of a first battery cell;
- inserting said first battery cell into a battery compartment, wherein said battery compartment is in fixed communication with said exterior; and moving said first battery cell to first position; and
- inserting a second battery cell into said batten compartment, wherein said second battery cell exerts a force on said first battery cell.

14. The method of claim 13 further comprising, moving said second battery cell to a second position.

15. A method of unloading at least one battery cell of a battery range extender system for a tractor-trailer, said tractor-trailer having a trailer; said trailer having an exterior; said method comprising:
- inserting extensions of a loading device into at least one guide channel of a second battery cell; and
- removing said second battery cell from a battery compartment, wherein said battery compartment is in fixed communication with said exterior; and
- removing a first battery cell from said battery compartment wherein said first battery cell and said second battery cell were in close communication.

16. The method of claim 15 further comprising, attaching a mechanism first end to said first battery cell and a mechanism second end to a vehicle, and advancing said vehicle, wherein said first battery cell is removed from said battery compartment.

* * * * *

UNITED STATES PATENT AND TRADEMARK OFFICE
CERTIFICATE OF CORRECTION

PATENT NO. : 10,752,102 B2
APPLICATION NO. : 16/362343
DATED : August 25, 2020
INVENTOR(S) : Lampsa et al.

Page 1 of 1

It is certified that error appears in the above-identified patent and that said Letters Patent is hereby corrected as shown below:

In the Claims

Column 20, Claim 13, Line 11 Delete "batten" and substitute --- battery ---

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*